United States Patent

[11] 3,583,659

| | | |
|---|---|---|
| [72] | Inventor | Lucien Lermusiaux<br>Saint-Etienne, France |
| [21] | Appl. No. | 817,797 |
| [22] | Filed | Apr. 21, 1969 |
| [45] | Patented | June 8, 1971 |
| [73] | Assignee | Societe De Construction Et' D' Exploitation<br>De Materials Et Moteurs S.C.E.M.M.<br>Paris, France |
| [32] | Priority | Apr. 26, 1968 |
| [33] | | France |
| [31] | | 149,753 |

[54] ROTARY-WING AIRCRAFT HAVING AN AUXILIARY ROTOR AT ITS TAIL
6 Claims, 7 Drawing Figs.

[52] U.S. Cl. .................................................. 244/17.19,
416/123, 416/247
[51] Int. Cl. ...................................................... B64c 27/82
[50] Field of Search .......................................... 244/17.19,
17.21, 17.17, 17.15, 17.11, 6, 7; 416/120, 121, 122, 123, 247

[56] References Cited
UNITED STATES PATENTS

| | | | |
|---|---|---|---|
| 1,964,179 | 6/1934 | Roth et al. ................. | 244/17.19UX |
| 2,135,073 | 11/1938 | Gerhardt et al. ........... | 244/17.19UX |
| 2,994,384 | 8/1961 | Stevens ...................... | 244/17.19X |
| 3,116,036 | 12/1963 | Nichols ...................... | 244/17.19X |
| 3,241,791 | 3/1966 | Piasecki ..................... | 244/17.19 |
| 3,260,482 | 7/1966 | Stroukoff .................... | 244/17.19X |
| 3,332,643 | 7/1967 | Toner .......................... | 244/7 |

FOREIGN PATENTS

| | | | |
|---|---|---|---|
| 572,417 | 10/1945 | Great Britain ............... | 416/123 |

*Primary Examiner*—Milton Buchler
*Assistant Examiner*—Paul E. Sauberer
*Attorney*—Fleit, Gipple & Jacobson ABSTRACT: In addition to the rotary lifting aerofoil, the aircraft has, inside an opening formed in the vertical fin, an auxiliary rotor. The horizontal stabilizer is arranged in the form of at least one ring surrounding the rotor, so that these rings play the double role of a horizontal stabilizer and of a protective member against shocks.

INVENTOR
LUCIEN LERMUSIAUX
BY Stevens, Davis, Miller & Mosher
ATTORNEYS

ROTARY-WING AIRCRAFT HAVING AN AUXILIARY ROTOR AT ITS TAIL

This invention relates to rotary-wing aircraft of the type which have a single-lifting rotary aerofoil and whose tail carries at least one auxiliary rotor driven by a motor, the axis of this auxiliary rotor being substantially perpendicular to the longitudinal axis of the aircraft, and at least one vertical stabilizer (fin) and at least one horizontal stabilizer.

The invention is more particularly, but not exclusively, concerned with aircraft of this type, whose rotary aerofoil is driven by a motor, the axis of the auxiliary rotor being substantially perpendicular to the vertical plane of symmetry of the aircraft, and the horizontal translation of the aircraft being ensured by the main rotor (helicopters) or by one or more propellers.

It is known that most helicopters are carried by a single rotary aerofoil. When this aerofoil is driven mechanically, the helicopter should have an auxiliary rotor, generally called "antitorque rotor," which balances the torque of the rotary aerofoil. On the contrary, when this rotary aerofoil is driven by reaction, such an auxiliary rotor is not indispensable, but it is often considered useful for conferring on the aircraft good handling qualities in yaw.

The antitorque rotor is usually placed at the rear of the aircraft, its axis being substantially perpendicular to the vertical plane of symmetry of the aircraft. It is controlled in thrust, by controlling its pitch and/or its rotational speed. Because of the direction of the axis of this rotor, the control of its thrust has substantially no effect upon the longitudinal balance of the aircraft and upon its speed. Thus the yaw control can be operated without interfering with the longitudinal control and the speed of the aircraft. Conversely, a moderate change in speed has almost no effect upon the yaw equilibrium, even in the low speed range.

In a similar manner, in the case of rotary-wing aircraft provided with at least one auxiliary rotor for their longitudinal control, this auxiliary rotor can be disposed at the rear of the aircraft so as to rotate about an axis substantially parallel to the axis of the main rotor. Such an auxiliary rotor is able to control the pitch of the body of the aircraft without altering its translational speed.

It is also known that the tails of rotary-wing aircraft usually carry control surfaces or vertical stabilizers (fins) and horizontal stabilizers.

An object of this invention is to provide these rotary-wing aircraft with a certain measure of safety, both with respect to injuries which the auxiliary rotor might cause to the personnel moving around on the ground in the vicinity of the aircraft tail, and with respect to damage which the auxiliary motor might undergo itself by striking objects which are exterior to the aircraft.

For these purposes, according to the invention, rotary-wing aircraft of the type are characterized by the fact that the auxiliary rotor or rotors are disposed inside or close to an opening formed in the form of at least one ring surrounding the rotor, so that this ring plays the double role of stabilizer and of protective member against shocks; more particularly, in the case of helicopters, this opening is preferably provided in the vertical fin (vertical stabilizer), the protective ring or rings then forming the horizontal stabilizer.

In any case, the invention will be able to be well understood with the aid of the following complementary description, as well as of the accompanying drawings, which complementary description and drawings are merely given by way of example.

FIG. 1 of these drawings shows in schematic perspective a light helicopter constructed according to the invention;

The following description relates to a light helicopter.

Figure 1:
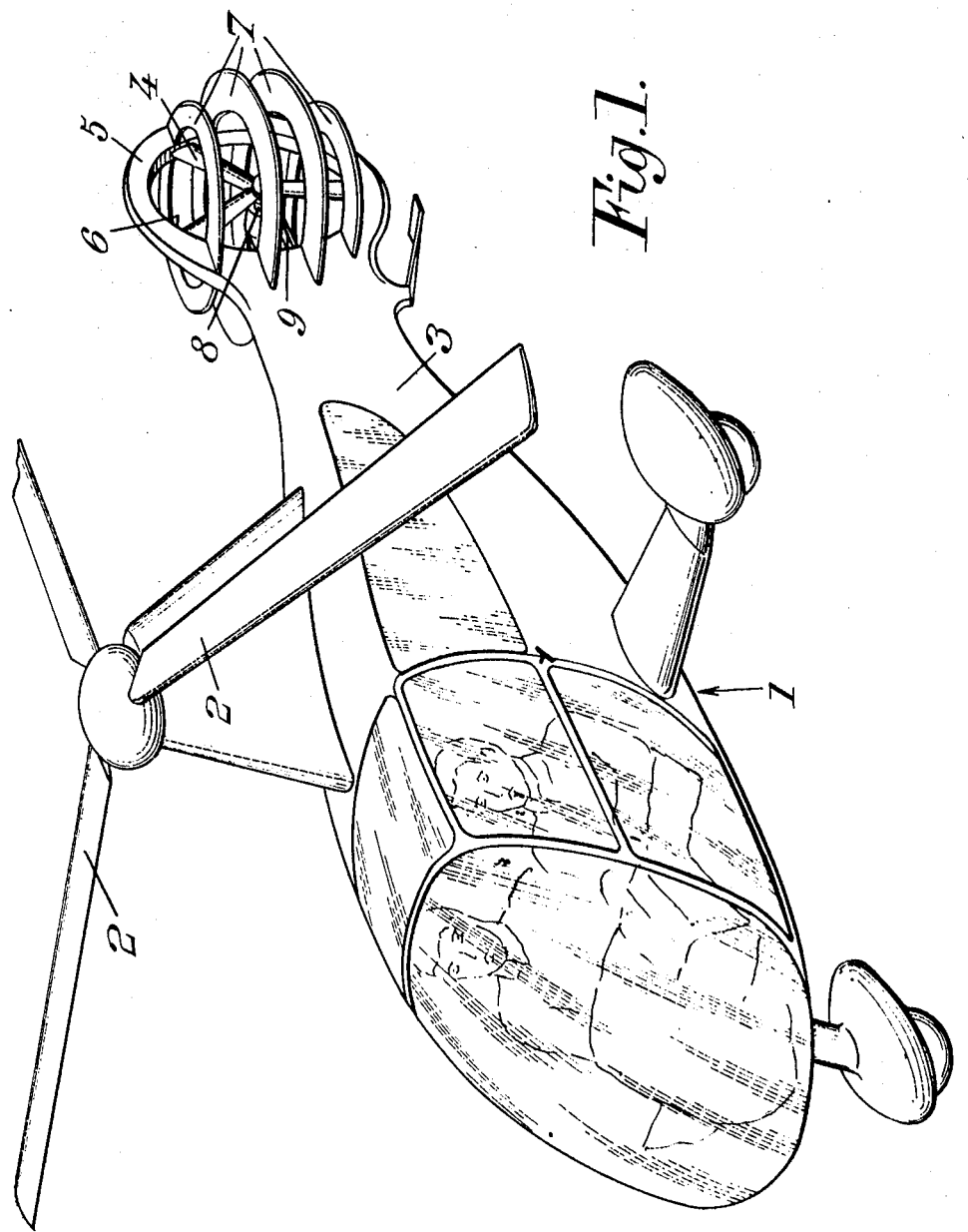

With regard to the aircraft 1 as a whole, it is constructed in any appropriate manner such that it has a rotary aerofoil 2, adapted to be driven about a substantially vertical axis by a motor (not shown), and that its tail 3, which is in general constituted by a streamlined tail-girder, carries an auxiliary rotor 4 driven by a motor (not shown) and a vertical stabilizer or fin 5 (see FIG. 1).

This being the case, in accordance with the present invention, the auxiliary rotor 4 is disposed inside an opening (or window) 6 formed in the vertical fin 5, and the horizontal stabilizer is arranged in the form of at least one ring 7—four rings 7 in the example of FIG. 1—surrounding the rotor 4, so that these rings 7 play the double role of a horizontal stabilizer and of a member for protecting against shocks.

Preferably, the rotor 4 is situated inside the volume of the vertical fin and its external diameter is hardly less than the diameter of the opening 6. Its axle 8 (see also FIG. 2) is advantageously carried by at least one radial arm 9 fixed at its outer part to the inner wall of the opening 6 and disposed on one side of the rotor. The motor of this rotor can drive it through a shaft 10 driving the axle 8 by means of bevel gears 11.

Figure 2:
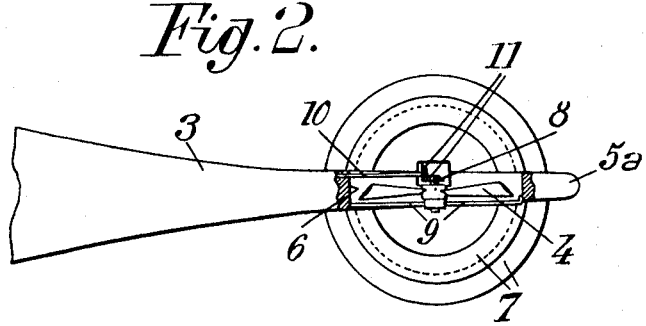
FIG. 2 shows in plan, with parts in section, the tail of an aircraft similar to the aircraft of FIG. 1.
Figure 3:
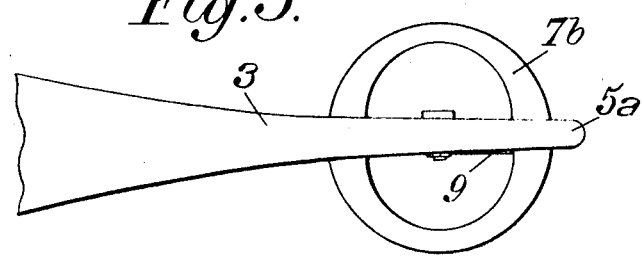
FIG. 3 shows in plan the tail of an aircraft constructed according to a modification of FIG. 2.
Figure 4:
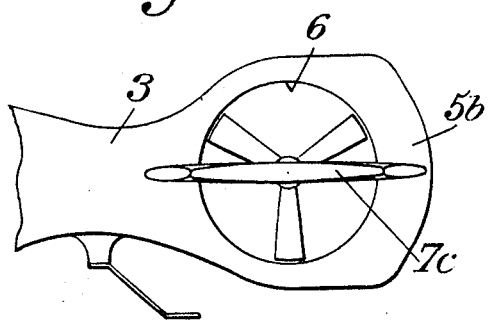
FIGS. 4 and 5 show, respectively in elevation and in plan, the tail of a helicopter constructed according to another embodiment.
Figure 7:
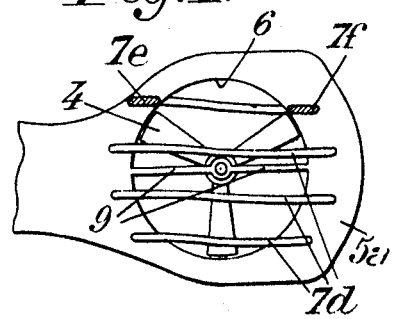
FIG. 7 shows in elevation, with parts in section, the tail of an aircraft established according to still another embodiment.
Figure 5:
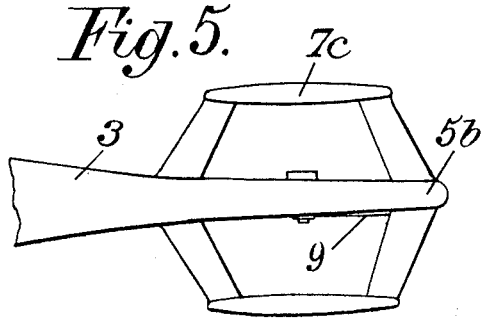

As shown in FIGS. 1 and 2, the ring or rings 7 can be of circular external and internal. They can also, as shown at 7b in FIG. 3, have an external and/or internal shape constituted by two circular arcs of different centers. Again, the ring or rings 7 can assume any other shape leaving a large space in the central region, and, for example, a polygonal shape, in particular hexagonal, as shown at 7c in FIGS. 4 and 5. In any case, the rings such as 7, 7b, 7c have a profile which is not very thick and have a mean plane in the neighborhood of the horizontal in normal flying attitude. As shown in FIGS. 1 and 4, each ring can have a substantially horizontal plane of symmetry. Again, as shown at 7d in FIG. 7, each ring can be such that its substantially horizontal forward edge 7e is offset vertically with respect to its horizontal rear edge 7f, the ring then being skewed helically as a whole to make up for the difference of height. The ring or rings, such as those shown at 7 in FIG. 1, can project out, towards the rear, beyond the vertical fin 5. Again, they can, according to the embodiments represented in FIGS. 3 and 7, be attached to their rear part to the vertical fin 5a at a zone situated in front of the rear end of the vertical fin or stop at the same rear level as the vertical fin 5b (FIG. 4).

Figure 6:
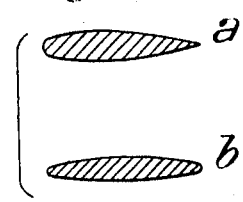
FIG. 6 shows in section two possible profiles for the horizontal stabilizers of the preceding Figures.

With regard to the cross section of each ring such as 7, it can be unsymmetrical, as shown at a in FIG. 6, so as to present a leading edge and a trailing edge analogous to those of an aircraft wing. Again, as shown at b in this same FIG., it can have a symmetrical and identical cross section along the entire development of the ring, which facilitates the construction of the ring since, for example, the periphery of this ring, which forms the leading edge at the front, becomes the trailing edge at the rear.

Due to this invention, the ring or rings such as 7 play the role of a stabilizer (horizontal stabilizer) and of a protective member for protecting against shocks. These rings provide aerodynamic forces favorable to the maneuverability and to the stability of flight of the helicopter, while disturbing as little as possible the air intake and delivery of the auxiliary rotor 4.

Various modifications are possible. In particular, instead of a single rotor, there can be, inside the rings, two or more rotors, either intermeshing or not, whose axles can make any angle whatsoever between them provided that they are substantially parallel to the means plane of the rings.

Various other modifications or changes can also be made without departing from the spirit or scope of this invention as defined by the appended claims.

What I claim is:

1. Rotary-wing aircraft having a tail which carries at least one auxiliary rotor driven by a motor, said auxiliary rotor having an axis substantially perpendicular to the longitudinal axis of the aircraft, at least one vertical stabilizer and at least one horizontal stabilizer, wherein said at least one auxiliary rotor is disposed within a space bounded by said stabilizers, one of said stabilizers being arranged in the form of at least one ring surrounding said rotor so that this ring plays the double role of a stabilizer and of a shock-protecting member.

2. Rotary-wing aircraft according to claim 1, whose rotary wing is driven by a motor (helicopter). wherein said vertical stabilizer is a vertical fin and said space is bounded within said vertical fin, said at least one protective ring then forming the horizontal stabilizer.

3. Rotary-wing aircraft according to claim 2, wherein each ring comprises two ring elements disposed one on each side of said vertical fin, and the exterior contour of each ring element situated on one side of said vertical fin is limited by circular arcs.

4. Rotary-wing aircraft according to claim 2, wherein each ring has a polygonal profile.

5. Rotary-wing aircraft according to claim 2, wherein each ring comprises two ring elements disposed one on each side of said vertical fin, and each ring element has the form of a helical skew.

6. Rotary-wing aircraft according to claim 2, wherein said vertical fin has a thickness sufficient to contain, within that thickness, the auxiliary rotor.